United States Patent
Pugh et al.

(10) Patent No.: US 9,406,969 B2
(45) Date of Patent: Aug. 2, 2016

(54) METHODS AND APPARATUS TO FORM THREE-DIMENSIONAL BIOCOMPATIBLE ENERGIZATION ELEMENTS

(71) Applicant: Johnson & Johnson Vision Care, Inc., Jacksonville, FL (US)

(72) Inventors: Randall B. Pugh, St.Johns, FL (US); Daniel B. Otts, Fruit Cove, FL (US); Frederick A. Flitsch, New Windsor, NY (US); Katherine Hardy, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 125 days.

(21) Appl. No.: 13/839,144

(22) Filed: Mar. 15, 2013

(65) Prior Publication Data

US 2014/0272522 A1    Sep. 18, 2014

(51) Int. Cl.

| | |
|---|---|
| *H01M 10/04* | (2006.01) |
| *H01M 2/02* | (2006.01) |
| *H01M 4/04* | (2006.01) |
| *H01M 4/08* | (2006.01) |
| *H01M 4/24* | (2006.01) |
| *H01M 4/26* | (2006.01) |
| *H01M 4/38* | (2006.01) |
| *H01M 4/42* | (2006.01) |
| *H01M 4/66* | (2006.01) |
| *H01M 6/06* | (2006.01) |
| *H01M 6/22* | (2006.01) |
| *H01M 6/40* | (2006.01) |

(52) U.S. Cl.
CPC ........ *H01M 10/0436* (2013.01); *H01M 2/0207* (2013.01); *H01M 2/0257* (2013.01); *H01M 4/0414* (2013.01); *H01M 4/08* (2013.01); *H01M 4/244* (2013.01); *H01M 4/26* (2013.01); *H01M 4/38* (2013.01); *H01M 6/22* (2013.01); *H01M 6/40* (2013.01); *H01M 4/42* (2013.01); *H01M 4/661* (2013.01); *H01M 6/06* (2013.01); *H01M 2220/30* (2013.01); *H01M 2300/0085* (2013.01); *Y02E 60/124* (2013.01); *Y10T 29/49115* (2015.01)

(58) Field of Classification Search
None
See application file for complete search history.

(56) References Cited

U.S. PATENT DOCUMENTS

| 5,561,004 | A | 10/1996 | Bates et al. | |
|---|---|---|---|---|
| 6,379,835 | B1* | 4/2002 | Kucherovsky et al. | 429/118 |
| 8,815,450 | B1* | 8/2014 | Bates | 429/231.95 |
| 2003/0108795 | A1* | 6/2003 | Tamura et al. | 429/231.95 |
| 2003/0152815 | A1* | 8/2003 | LaFollette et al. | 429/7 |
| 2008/0305399 | A1* | 12/2008 | Martin et al. | 429/306 |
| 2010/0076553 | A1* | 3/2010 | Pugh et al. | 623/6.22 |
| 2010/0266895 | A1* | 10/2010 | Tucholski | 429/185 |
| 2012/0236524 | A1 | 9/2012 | Pugh et al. | |

OTHER PUBLICATIONS www.merriam-websters.com definition of the term "three-dimensional" (no date available).*
EP Search Report Application No. EP 14 16 0054 Dated May 23, 2014.
http://web.archive.org/web/20070726200624/http://www.powerpaper.coml?categoryld= 1 0625 1 The reference cited is a website that is no longer available/active. However, an archived version of the website at the D time it was available and looked at by the inventors is provided accordingly.

* cited by examiner

*Primary Examiner* — Gregg Cantelmo

(57) ABSTRACT

Methods and apparatus to form three-dimensional biocompatible energization elements are described. In some embodiments, the methods and apparatus to form the three-dimensional biocompatible energization elements involve forming conductive traces on the three-dimensional surfaces and depositing active elements of the energization elements on the conductive traces. The active elements are sealed with a biocompatible material. In some embodiments, a field of use for the methods and apparatus may include any biocompatible device or product that requires energization elements.

23 Claims, 5 Drawing Sheets

METHODS AND APPARATUS TO FORM THREE-DIMENSIONAL BIOCOMPATIBLE ENERGIZATION ELEMENTS

FIELD OF USE

Methods and apparatus to form three-dimensional biocompatible energization elements are described. In some embodiments, the methods and apparatus to form the three-dimensional biocompatible energization elements involve forming conductive traces on the three-dimensional surfaces and depositing active elements of the energization elements on the conductive traces. The active elements are sealed with a biocompatible material. In some embodiments, a field of use for the methods and apparatus may include any biocompatible device or product that requires energization elements.

BACKGROUND

Recently, the types of medical devices and their functionality has begun to rapidly develop. These medical devices can include, for example, implantable pacemakers, electronic pills for monitoring and/or testing a biological function, surgical devices with active components, contact lenses, infusion pumps, and neurostimulators. Added functionality and an increase in performance of the aforementioned medical devices have been developed. However, to achieve the theorized added functionality, many of these devices now require self-contained energization means that are compatible with the size and shape requirements of these devices, as well as the energy requirements of the new energized components.

Some medical devices may include components such as semiconductor components that perform a variety of functions that can be incorporated into many biocompatible and/or implantable devices. However, such semiconductor components require energy and, thus, energization elements must also be included in such biocompatible devices. The topology and relatively small size of the biocompatible devices creates novel and challenging environments for the definition of various functionalities. In many embodiments, it is important to provide safe, reliable, compact and cost effective means to energize the semiconductor components within the biocompatible devices. Therefore, a need exists for novel embodiments of forming three-dimensional biocompatible energization elements for their implantation within or upon biocompatible devices.

SUMMARY

Accordingly, methods and apparatus to form three-dimensional biocompatible energization elements on three-dimensional surfaces and including the same in biocompatible devices are disclosed.

According to some embodiments, three-dimensional biocompatible energization elements and methods of forming the same are disclosed. A method includes receiving a substrate made from an insulating material, the substrate having a three-dimensional surface, forming two or more conductive traces on the three-dimensional surface, depositing an anode chemical formulation on at least part of one of the conductive traces to form an anode, depositing a cathode chemical formulation on at least part of another of the conductive traces to form a cathode, depositing an electrolyte over at least part of the anode and the cathode, and encapsulating the anode, the cathode, and the electrolyte using a biocompatible material to form a three-dimensional biocompatible energization element.

The three-dimensional surface can comprise two or more non-parallel planes and at least a portion of the three-dimensional surface may be roughened or coated before and/or during the deposition of one or more of the formulations. The electrolyte may be a gel type electrolyte which may be encapsulated with the anode and cathode using a biocompatible material, such as parylene-C. In some embodiments a bridge element can be in contact with the anode and the cathode.

DESCRIPTION OF THE DRAWINGS

Like reference symbols indicate like elements throughout the specification and drawings.

DETAILED DESCRIPTION OF THE INVENTION

Figure 1:
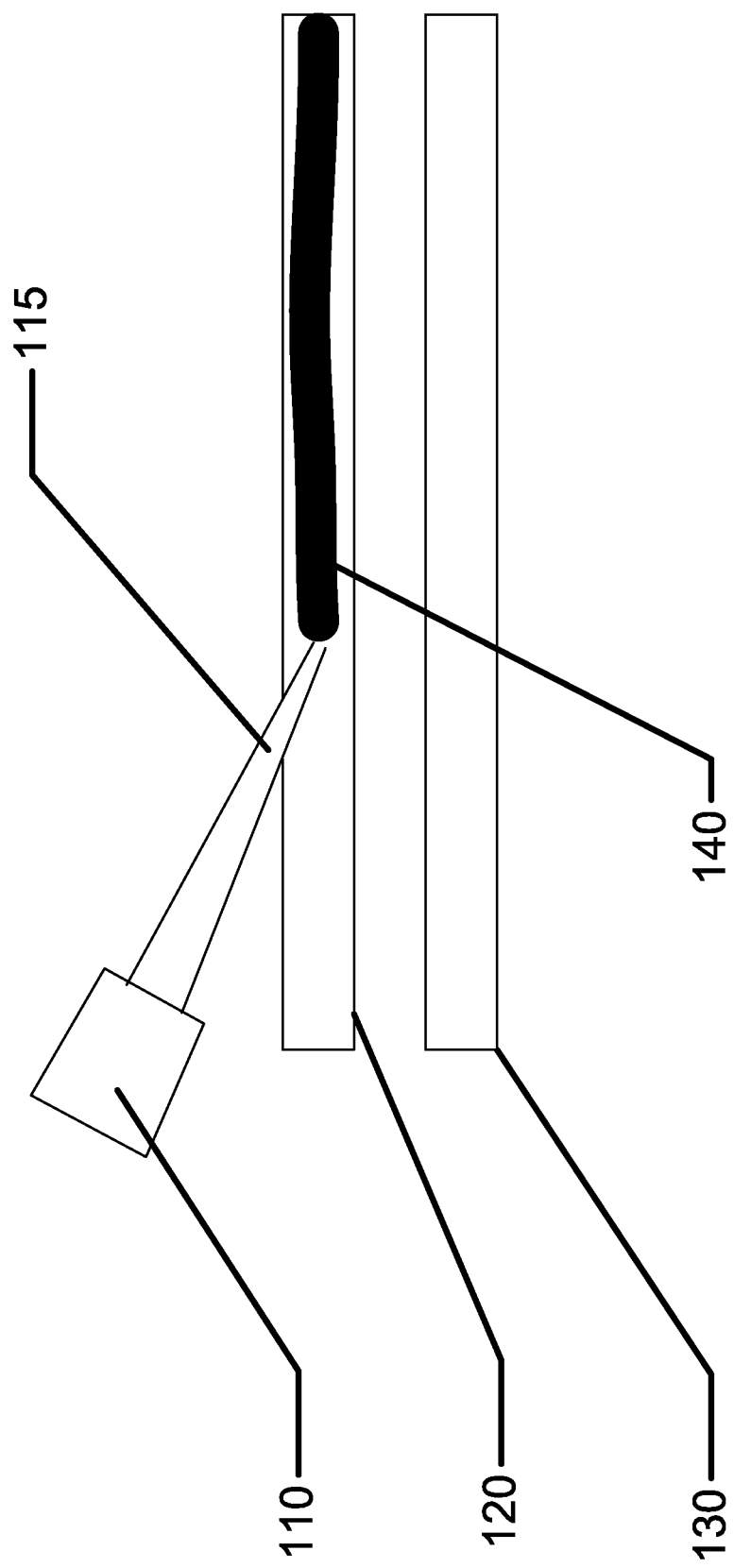
FIG. 1 illustrates a representation of an exemplary printing apparatus that may be used to deposit chemical mixtures on a three-dimensional surface.

Methods and apparatus to form three-dimensional biocompatible energization elements are disclosed. The description of both preferred and alternative embodiments are exemplary embodiments only, and various modifications and alterations may be apparent to those skilled in the art. Therefore, the exemplary embodiments do not limit the scope of this application. The three-dimensional biocompatible energization elements are designed for use in or proximate to the body of a living organism.

Glossary

In the description and claims below, various terms may be used for which the following definitions will apply:

"Anode" as used herein refers to an electrode through which electric current flows into a polarized electrical device. The direction of electric current is typically opposite to the direction of electron flow. In other words, the electrons flow from the anode into, for example, an electrical circuit.

"Binders" as used herein refer to a polymer that is capable of exhibiting elastic responses to mechanical deformations and that is chemically compatible with other energization element components. For example, binders may include electroactive materials, electrolytes, current collectors, etc.

"Biocompatible" as used herein refers to a material or device that performs with an appropriate host response in a specific application. For example, a biocompatible device does not have toxic or injurious effects on biological systems.

"Cathode" as used herein refers to an electrode through which electric current flows out of a polarized electrical device. The direction of electric current is typically opposite to the direction of electron flow. Therefore, the electrons flow into the cathode of the polarized electrical device and out of, for example, the connected electrical circuit.

"Coating" as used herein refers to a deposit of material in thin forms. In some uses, the term will refer to a thin deposit that substantially covers the surface of a substrate it is formed upon. In other more specialized uses, the term may be used to describe thin deposits in smaller regions of the surface.

"Electrode" as used herein can refer to an active mass in the energy source. For example, it may include one or both of the anode and cathode.

"Energized" as used herein refers to the state of being able to supply electrical current or to have electrical energy stored within.

"Energy" as used herein refers to the capacity of a physical system to do work. Many uses of the energization elements may relate to the capacity of being able to perform electrical actions.

"Energy Source" or "Energization Element" or "Energization Device" as used herein refers to any device or layer which is capable of supplying energy or placing a logical or electrical device in an energized state. The energization elements may include batteries. The batteries can be formed from alkaline cell chemistry and may be solid-state batteries or wet cell batteries.

"Fillers" as used herein refer to one or more energization element separators that do not react with either acid or alkaline electrolytes. Generally, fillers may include substantially water insoluble materials such as carbon black; coal dust; graphite; metal oxides and hydroxides such as those of silicon, aluminum, calcium, magnesium, barium, titanium, iron, zinc, and tin; metal carbonates such as those of calcium and magnesium; minerals such as mica, montmorollonite, kaolinite, attapulgite, and talc; synthetic and natural zeolites such as Portland cement; precipitated metal silicates such as calcium silicate; hollow or solid polymer or glass microspheres, flakes and fibers; etc.

"Functionalized" as used herein refers to making a layer or device able to perform a function including for example, energization, activation, and/or control.

"Mold" as used herein refers to a rigid or semi-rigid object that may be used to form three-dimensional objects from uncured formulations. Some preferred molds include two mold parts that, when opposed to one another, define the structure of a three-dimensional object.

"Power" as used herein refers to work done or energy transferred per unit of time.

"Rechargeable" or "Re-energizable" as used herein refer to a capability of being restored to a state with higher capacity to do work. Many uses may relate to the capability of being restored with the ability to flow electrical current at a certain rate for certain, reestablished time periods.

"Reenergize" or "Recharge" as used herein refer to restoring to a state with higher capacity to do work. Many uses may relate to restoring a device to the capability to flow electrical current at a certain rate for a certain, reestablished time period.

"Released" as used herein and sometimes referred to as "released from a mold" means that a three-dimensional object is either completely separated from the mold, or is only loosely attached to the mold, so that it may be removed with mild agitation.

"Stacked" as used herein means to place at least two component layers in proximity to each other such that at least a portion of one surface of one of the layers contacts a first surface of a second layer. In some embodiments, a coating, whether for adhesion or other functions, may reside between the two layers that are in contact with each other through said coating.

"Three-dimensional Surface" or "Three-dimensional Substrate" as used herein refers to any surface or substrate that has been three-dimensionally formed where the topography includes two or more non-parallel planes, in contrast to a planar surface. A curved surface, for example, may be a three-dimensional surface.

"Traces" as used herein refer to energization element components capable of electrically connecting together the circuit components. For example, circuit traces may include copper or gold when the substrate is a printed circuit board and may be copper, gold, or printed deposit in a flex circuit. Traces may also be comprised of nonmetallic materials, chemicals, or mixtures thereof.

Printing Three-Dimensional Biocompatible Energization Elements

The methods and apparatus presented herein relate to forming three-dimensional biocompatible energization elements for inclusion within or on three-dimensional biocompatible devices.

FIG. 1 illustrates a method for forming energization elements by printing techniques. In these examples the phrase "printing techniques" is broadly represented by the process of depositing or leaving a deposit of material in defined locations. Although the descriptions below will focus on "additive" techniques where material is placed at certain isolated locations upon a surface, "subtractive" techniques where a coating may be subsequently patterned to allow for the removal of material in selected locations which thereafter may result in a pattern of isolated locations are also within the scope of this application.

A pair of conductive traces 120 and 130 and an example printer 110 are depicted in FIG. 1. Two conductive traces 120 and 130 are illustrated in FIG. 1 and, in some embodiments, two or more conductive traces can be included or formed on the three-dimensional surface. Each conductive trace is preferably electrically conductive to provide an electrical potential for forming the anode, the cathode, and other active elements. In some embodiments, the conductive traces 120 and 130 can be electrically connected to one another to provide an electrical connection for the active elements of the energization elements.

In some embodiments, as illustrated in FIG. 1, the conductive traces 120 and 130 can lay relatively close to a neighboring conductive trace. The neighboring conductive traces may represent the opposite polarity electrode or chemistry type when active elements are produced upon these traces. For example, one of conductive traces 120 and 130 can be the location of an anode and the other can be the location of a cathode.

The printer 110 may have a printing head 115, which can control the distribution of material into a defined, localized region. In the simplest of embodiments, the printing head 115 may include a stainless steel needle which may have an exit orifice sized from, for example, 150 microns to 300 microns. The printing head 115 can be made a precision stainless steel tip for cathode and anode printing and, more specifically, a 25 gauge, 27 gauge, 30 gauge or 32 gauge by 1.4" length tip. Other examples of printing heads 115 are also within the scope of this application and can vary depending on different factors, such as precision requirements, chemical compositions to be deposited, or the like.

The anode represents the negative (−) potential connection of an energization element and the cathode represents the positive (+) potential connection of an energization element to incorporated devices. While particular orientations of the anode and the cathode are described throughout the following description, the orientations of the anode and the cathode can be changed, e.g., reversed. In some embodiments, the cathode can be configured to have a larger surface area than the anode.

The printer 110 may contain and be loaded with a mixture of a variety of active and supportive materials for use in forming various components of an energization element. These combinations of materials may contain an active anode or cathode materials in microscopic powder form. In some embodiments, the various materials may be processed in sorting manners, such as sieving, to result in a mixture which has a narrow and controlled size distribution of powder constituents. In one example, one anode mixture may contain a zinc powder formulation comprising powder components small enough to pass through a 25-micron sieve. By restricting the size of the components in the various materials, the size of the orifice of the printing head 115 can be relatively small, such as 100 to 200 microns. As such, a battery that includes complex three dimensional contours and is very small in size can be formed.

Table 1 shows an exemplary mixture of components for a printable anode formulation. Table 2 shows an exemplary mixture of components for a printable cathode formulation. And, Table 3 shows an exemplary mixture of components for an optional printable bridge element formulation. As illustrated in Tables 1-3, in addition to the active components, a variety of solvents, fillers, binders, etc. can be included in the exemplary mixtures. It is also apparent to one of ordinary skill in the art that numerous modifications to the makeup, constituents, amounts of constituents, nature of the constituents and other such changes may be within the scope of this application.

TABLE 1

Exemplary Anode Mixture

| Material | Function/Description |
|---|---|
| Poly(ethylene oxide) in distilled water | Diluted binder |
| Zinc alloy powder including Bismuth and Indium | Active anode |
| Aerosil R972 | Rheology modifier/stabilizer |
| Poly(ethylene glycol) in distilled water | Plasticizer |
| Triton X-100 in distilled water | Surfactant |

TABLE 2

Exemplary Cathode Mixture

| Material | Function |
|---|---|
| Poly(ethylene oxide) in distilled water | Diluted binder |
| Electrolytic manganese dioxide powder | Active cathode |
| Aerosil R972 | Rheology modifier |
| Silver flake | Conductive additive |
| Triton X-100 in distilled water | Surfactant |

TABLE 3

Exemplary Binder "Bridge" Separator Mixture

| Material | Function |
|---|---|
| Poly(ethylene oxide) in distilled water | Diluted binder |
| Barium Sulfate | Filler |
| Aerosil R972 | Rheology modifier |
| Poly(ethylene glycol) in distilled water | Plasticizer |
| Triton X-100 in distilled water | Surfactant |

When the printer 110 is loaded with a mixture, its printing head 115 can move relative to the three-dimensional surface or the three-dimensional surface may move relative to the printing head 115, by control mechanisms of the printer 110, such as automation used to locate the printing head 115 in a three-dimensional location above the conductive trace 120. Because the printing head 115 can be moved laterally, vertically, and/or longitudinally, the printing head 115 can deposit the chemical mixture over any three-dimensional surface with precision. Accordingly, the three-dimensional surface is not a single planar surface, but can include two or more non-parallel planes. In addition, the three-dimensional surface can include any number of shapes, projections, contours, irregularities, and/or topographies. For example, an energized lens, a pill, and a valve including micro scale contoured shapes are examples of devices with three-dimensional surfaces.

In one example, an automated dispenser or inkjet-type printer can be used as the printer 110. As the printing head 115 is moved relative to the three-dimensional surface, the printing head 115 can be configured to dispense some of the chemical mixture from the printer 110. The amount or rate of chemical mixture that is dispensed depends on, for example, the desired thickness of the component and/or the topography of the three-dimensional surface. For example, a thicker component can be deposited by increasing the amount or rate of the chemical mixture that is dispensed.

Following dispensing of the chemical mixture by the printing head 115, a line, multiple lines, a dot, a layer, and/or multiple dots may be formed into an appropriate feature, such as anode 140 on conductive trace 120. Different patterns of various chemical mixtures may be printed anywhere on the three-dimensional surface, both inside and outside of the conductive traces 120 and 130, to form different components of the energization element. In some embodiments, the chemical mixture can completely cover the conductive traces 120 and 130, whereas in other embodiments, the chemical mixture can partially cover the conductive traces 120 and 130. In embodiments where the chemical mixture partially covers the conductive traces 120 and 130, the conductive traces 120 and 130 may function as electrical interconnections for the energization elements. For example, if two energization elements are being formed on a three-dimensional surface, the energization elements can be connected in serial using one or more of the conductive traces 120 and 130.

Figure 2:
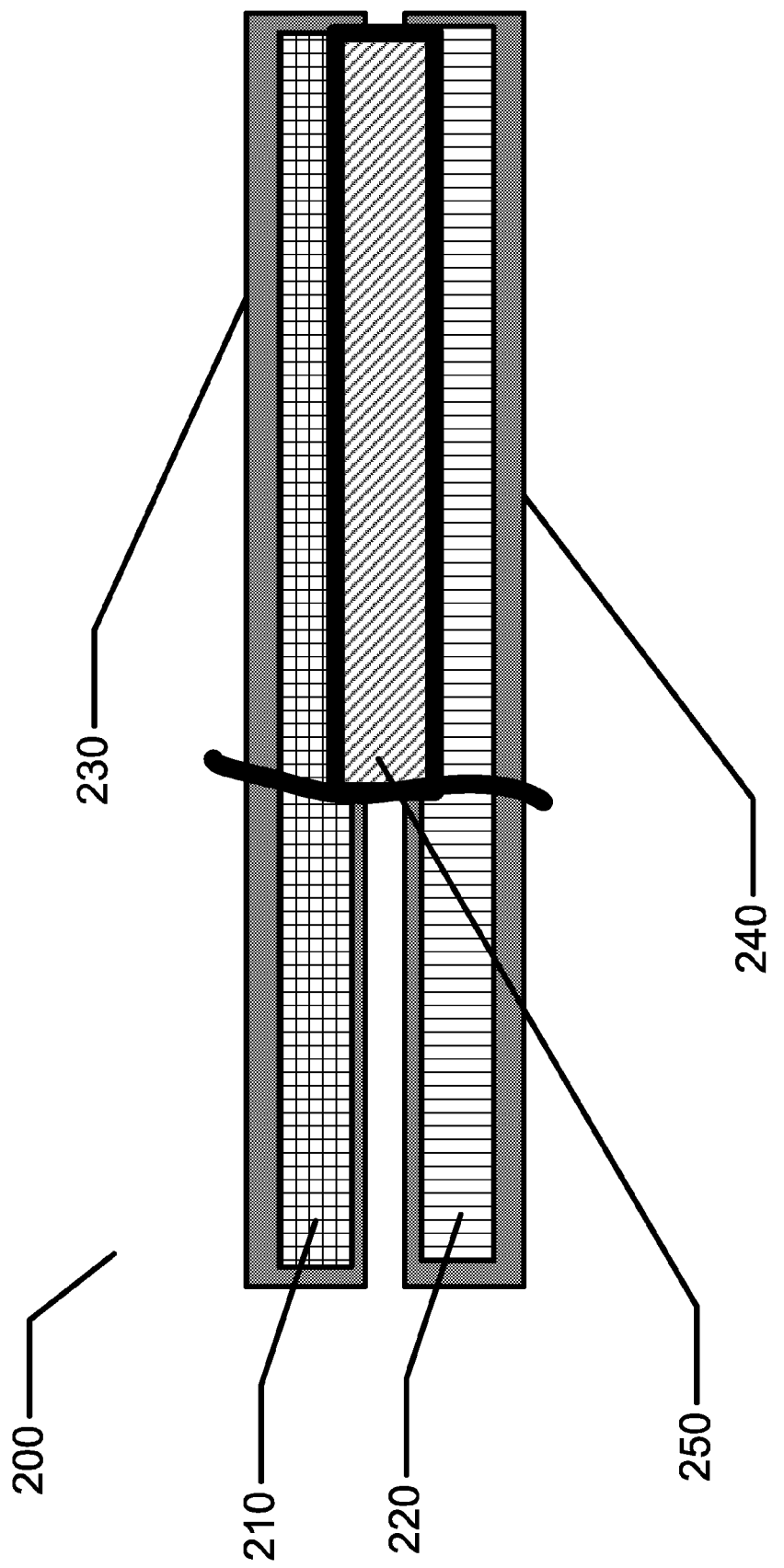
FIG. 2 illustrates a depiction of an exemplary energization element construction.

Referring now to FIG. 2, an example of a printed energization element 200 on a three-dimensional substrate including conductive traces 230 and 240 is illustrated where the electrode deposits 210 and 220 do not cover the entirety of their respective conductive traces 230 and 240. However, in alternative embodiments, the electrode deposits 210 and 220 can completely cover or even slightly transcend the conductive traces 230 and 240. Further, although FIG. 2 illustrates an example of printed features that lie upon conductive traces, such as the example anode 210 which lies upon the conductive trace 230 and the example cathode 220 which lies upon the conductive trace 240, other features can be printed anywhere on the three-dimensional surface. For example, in embodiments where the printed energization element 200 includes a bridge 250, the bridge 250 may be deposited between the conductive traces 230 and 240. In other examples, any other features can be positioned, printed, and/or deposited anywhere on the three-dimensional surface.

Figure 3:
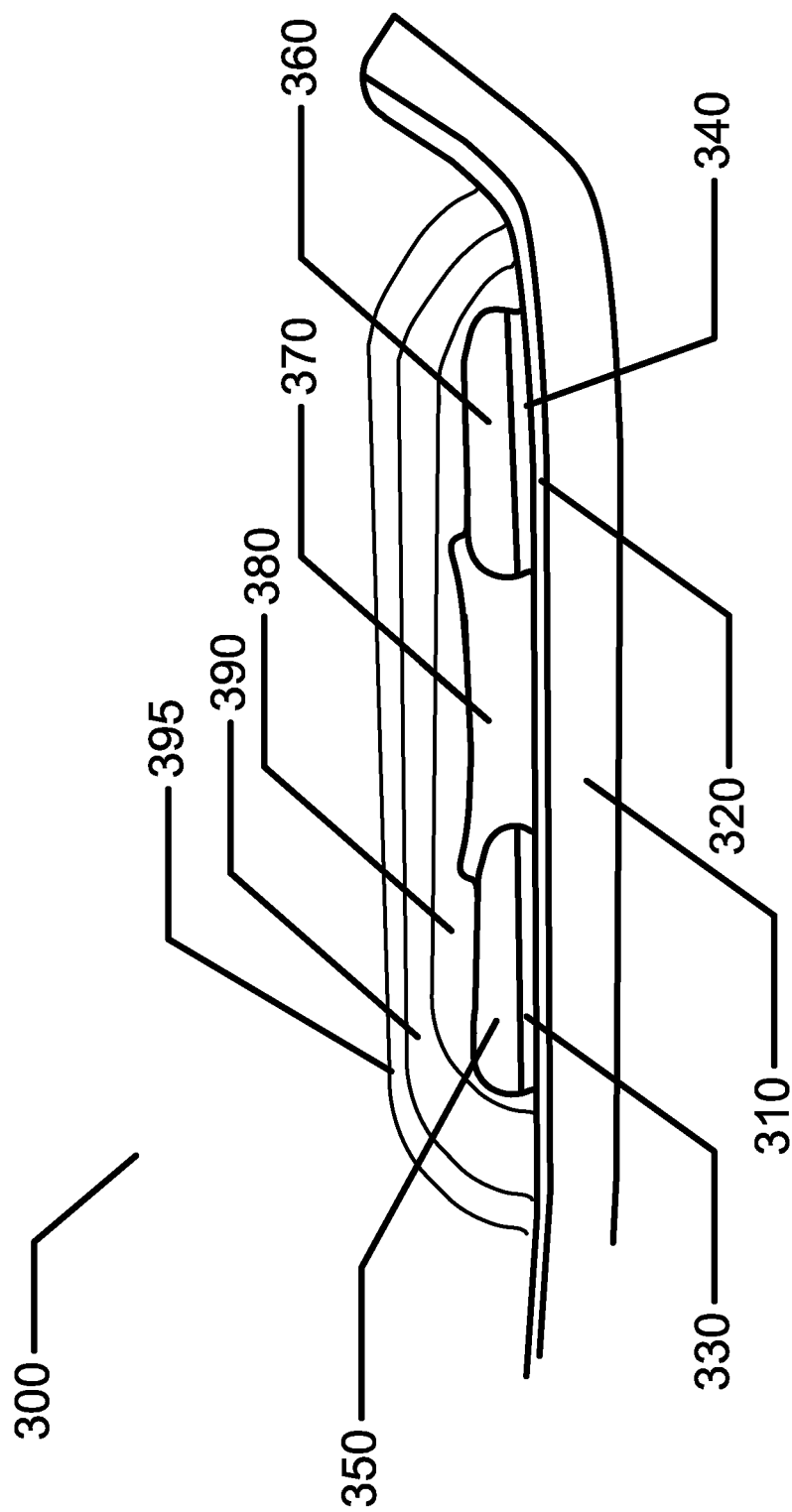
FIG. 3 illustrates an exemplary cross-sectional depiction of energization elements on a three-dimensional surface.

Referring to FIG. 3, an example of a cross-section of an energization element 300 on a three-dimensional surface 310 is illustrated. Although the three-dimensional surface 310 is shown as being relatively smooth, the three-dimensional surface 310 can include any number of shapes, projections, contours, irregularities, and/or topographies. In some embodiments, the three-dimensional surface 310 can be made of any electrically and/or physically insulating material, such as a monomeric composition and/or prepolymer material which may be crosslinked, silicone elastomers or hydrogels, poly(ethylene oxide), poly(acrylic acid), silicone hydrogels, fluorosilicone hydrogels, polypropylene, polystyrene, polyethylene, poly (methyl methacrylate), and/or modified polyolefin. Other materials that may be combined with one or more additives to form the three-dimensional surface include, for example, Zieglar-Natta polypropylene resins. The three-dimensional surface can be semi-rigid or flexible. The three-dimensional surface can be made of a biocompatible material. In other embodiments, the three-dimensional surface 310 can be made of a material which is electrically conductive or semi-conductive, such as a thermoplastic conductive material.

In some embodiments, an optional coating 320 can be applied over the three-dimensional surface 310. The coating can have any thickness to change the surface properties of the three-dimensional surface. The three-dimensional surface can be, for example, hydrophobic or hydrophilic. As such, coating of the three-dimensional surface with the coating 320, such as a polymer, can provide the three-dimensional surface with desired adherence characteristics for the materials to be deposited thereon. The coating 320 can be biocompatible and may include, for example, polyurethanes, (meth)acrylate-urethane copolymers, or the like.

Conductive traces 330 and 340 can be formed over the coating 320. Chemical mixtures can be deposited over the conductive traces 330 and 340 to form the elements of the energization element 300. For example, the anode 350 is formed over the conductive trace 330 by depositing chemicals useful to form an anode, as described above. The anode 350 can include, for example, lithium (Li), sodium (Na), magnesium (Mg), aluminum (Al), calcium (Ca), iron (Fe), zinc (Zn), cadmium (Cd), lead (Pb), intercalation compounds of lithium, and/or metal hydrides. Similarly, the cathode 360 is formed over the conductive trace 340 by depositing chemicals useful to form a cathode, as described above. The cathode 360 can include, for example, chlorine ($Cl_2$), sulfur dioxide ($SO_2$), manganese dioxide ($MnO_2$), nickel oxide hydroxide (NiOOH), copper chloride ($CuCl_2$), iron disulfide ($FeS_2$), silver oxide (AgO), bromine ($Br_2$), mercury oxide (HgO), lead oxide ($PbO_2$), and/or iodine ($I_2$). In some embodiments, the anode 350 can be formed over conductive trace 330 and the cathode 360 can be formed over conductive trace 340. Moreover, other active elements can be formed over the conductive traces 330 and 340 in addition to the anode 350 and the cathode 360 or in place of the anode 350 and the cathode 360.

The combination of the anode 350 and the cathode 360 are important components of an energization element, such as a battery. However, although the anode 350 and the cathode 360 are shown in a parallel and separated configuration, the anode 350 and the cathode 360 can be in any configuration. For example, depending on the lengths of the anode 350 and the cathode 360, the anode 350 and the cathode 360 may not have to be in parallel if they are not in direct contact with one another. In addition, the anode 350 and the cathode 360 do not have to be co-planar. Rather, they can be located at two different depths on the three-dimensional surface 310. For example, if the three-dimensional surface 310 includes an inward or outward projection and one of the anode 350 or the cathode 360 are deposited over the projection, one of the anode 350 or the cathode 360 can be in a lower or higher plane relative to the other. Moreover, in some embodiments, if the anode 350 can be formed to over an entirety of the three-dimensional surface 310, the cathode 360 can be formed over the anode 350 in a stacked configuration having an insulator between the anode 350 and the cathode 360.

In some embodiments, a bridge 370 that connects and at least partially or completely covers the anode 350 and the cathode 360 may optionally be formed. As illustrated in FIG. 3, the bridge 370 connects and partially covers the anode 350 and the cathode 360. The bridge 370 can be a porous insulator through which ionic diffusion may occur and be formed over the anode 350 and the cathode 360 by depositing chemicals useful to form a bridge, as described above.

An electrolyte 380 is deposited over the anode 350, the cathode 360, and the bridge 370. In a wet cell type energization element 300, the electrolyte 380 may be formed from a combination of a solvent, which in many cases may be an aqueous solution, and other chemicals. The electrolyte 380 establishes ionic conductivity between the anode 350 and the cathode 360. In some embodiments, the electrolyte 380 can be a liquid that can be permeated through the anode 350, the cathode 360, and the bridge 370 such that it would not be visible in the cross-section of the energization element 300 in FIG. 3. In other embodiments, the electrolyte 380 can be in gel form and partially or completely cover the anode 350, the cathode 360, and the bridge 370. The electrolyte 380 can be acidic, basic, or neutral, and be, for example, potassium hydroxide (KOH), sodium hydroxide (NaOH), zinc chloride ($ZnCl_2$), ammonium chloride ($NH_4Cl$), or the like.

The electrolyte 380 is encapsulated or sealed with a primary encapsulant 390, which can connect and seals the energization element 300 at both end of the three-dimensional surface 310. The primary encapsulant 390 should be non-conductive and can be epoxies, fluoropolymers, acrylics, silicones, polyurethanes, enamels, potting compounds, conformal coatings, or the like. In some embodiments, a secondary encapsulant 395 can optionally be included over the primary encapsulant 390. The primary encapsulant 390 and/or secondary encapsulant 395 may define a formed energization element. In some embodiments, the thickness of the primary encapsulant 390 and/or secondary encapsulant 395 can be consistent, while in other embodiments, the thickness can vary along an x-y plane of the energization element 300.

The outermost of the primary encapsulant 390 or the secondary encapsulant 395, depending on whether the energization element 300 includes the secondary encapsulant 395, provides barrier properties to block particles from entering or exiting the energization element, is chemically resistance so that it does not react with the environment in which it is in contact, and has little to no water intake. The outermost of the primary encapsulant 390 or the secondary encapsulant 395, depending on whether the energization element 300 includes the secondary encapsulant 395, is also made of a biocompatible material, such as a biocompatible polymer. The biocompatible material should exhibit sufficient strength to hold the various elements of the biocompatible energization element together while providing sufficient flexibility for varied applications. The biocompatible encapsulant can be made of, for example, alginates, parylenes, such as parylene-C, polyacrylonitriles ("PAN"), polyethylene glycols, polypyrroles, derivatised celluloses, polysulfones, polyamides, or the like.

Furthermore, while the cross-section of a printed energization element 300 in FIG. 3 illustrates an alkaline type wet cell battery, numerous other types of energization elements, including solid state batteries, may be formed. Moreover, although additive printing processes have been disclosed in detail, numerous subtractive processing methods can also be used to form the energization element 300. For example, lithography processes and subtractive etch processing can be used to remove desired regions. In some embodiments, a combination of subtractive and additive processes can be used where, for example, large deposits are made which are selectively removed to form the anode 350 and the cathode 360, while the bridge 370 can be formed by an additive process.

Aspects of the Design of Traces for Exemplary Energization Elements

Alkaline type wet cell batteries represent a complex example of an energization element. Amongst the constituents of these types of batteries, the electrolyte formulations may, in some embodiments, have basic (as opposed to acidic) characteristics. Adhesion of the various constituents to each other may be an important requirement in certain embodiments. In addition, in the presence of basic aqueous solutions, certain trace designs may allow for better adhesion than others.

Conductive traces that are, for example, hydrophobic and can be formed on a coating. An example of a trace formulation with such hydrophobic character may be traces formed from conductive epoxy formulations, such as metal impregnated pastes. These traces can contain a significant amount of conductive particles that have relatively low resistance, and the conductive traces may provide sufficient adherence to an underlying coating. The conductive traces of conductive epoxy can be formed using the printer discussed above or using any other deposition method. In some embodiments, the design of the conductive traces can have physical characteristics that may enhance adhesion either by allowing for additional surface area and/or by creating features that entrap deposited traces that are formed on them.

Figure 4:
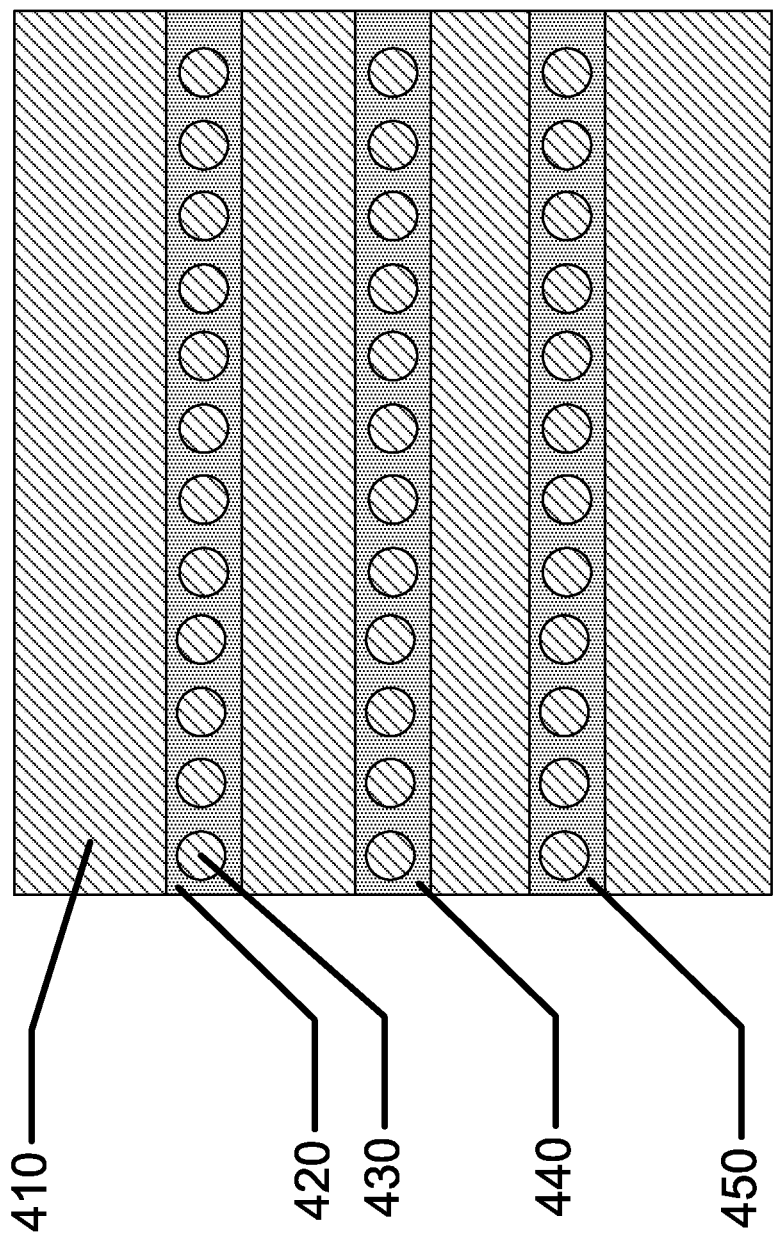
FIG. 4 illustrates an exemplary design for conductive traces operant for formation of energization elements with enhanced adhesion characteristics.

Referring to FIG. 4, an exemplary design of three conductive traces 420, 440, and 450 on a three-dimensional surface 410 is illustrated. The conductive traces can be formed such that there are missing portions, circular regions 430, within the conductive traces 420, 440, and 450. An additive process can be used to form the conductive traces 420, 440, and 450 so that the circular regions 430 are screened out of the process. Alternatively, a subtractive process can be used to form the conductive traces 420, 440, and 450 so that the circular regions 430 are removed or etched.

In some embodiments, the edge of the circular regions 430 may not be vertical and instead be, for example, undercut or retrograde. Isotropic etch chemistry, especially where the conductive traces 420, 440, and 450 are formed from a stack of different metallurgies, may result in a ledge protruding over the rest of the edge profile. Where the conductive trace material is applied by a printer, the subsequent material may be flowed under the ledge and can result in a better adherence. Regardless, many different designs of both protrusions and depressions may be operant to improve adhesion characteristics of the conductive traces 420, 440, and 450.

In some embodiments, different metallurgies may be required where the conductive traces 420, 440, and 450 are being used to form anodes and cathodes, which require different electrochemical potentials. Such different metallurgies ensure electrochemical compatibility of the conductive traces with the attached electrode materials. Various choices for the types of materials that make up the anode and cathode traces may include noble metals such as silver and gold, and other metals including zinc, nickel, aluminum, titanium and/or the conductive epoxies which may include silver, gold and/or copper flakes.

Methods of Forming Energization Elements on Three-Dimensional Surfaces

Figure 5:
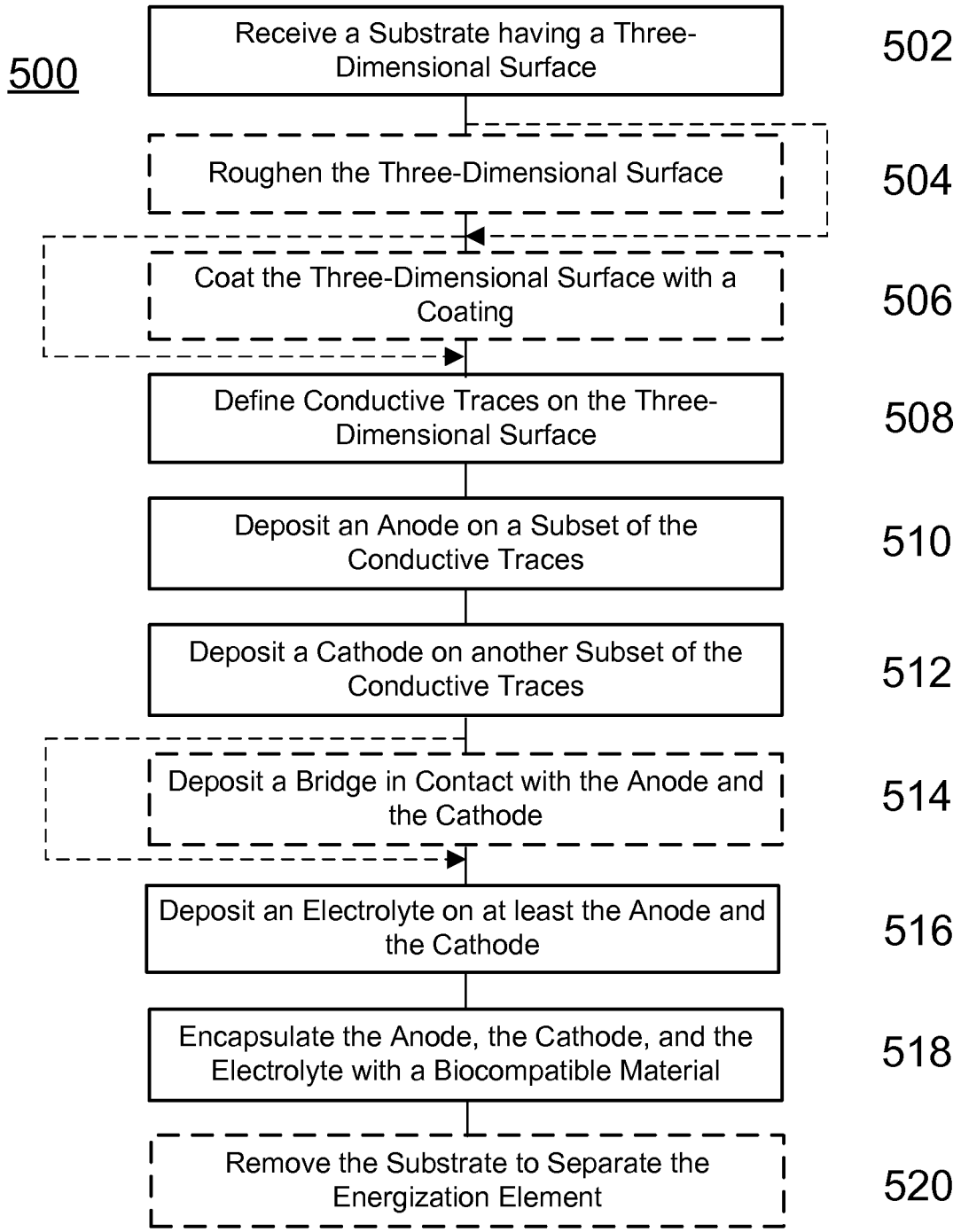
FIG. 5 illustrates an exemplary method for the formation of three-dimensional biocompatible energization elements on three-dimensional surfaces.

Referring to FIG. 5, an exemplary method 500 for forming energization elements on three-dimensional surfaces is disclosed. Initially, a substrate having a three-dimensional surface upon which various materials will be deposited to form an energization element is received (step 502). In some embodiments, the substrate may be received from another source or third-party, whereas in other embodiments the substrate may be formed by, for example, molding.

In some embodiments, the three-dimensional surface can optionally be roughened (step 504). The three-dimensional surface can be roughened by, for example, physically abrading the surface, gas phase etching, and/or liquid phase etching. A roughened surface may have desirable adhesion characteristics due both to the altered surface chemistry and/or also to the increased physical surface area. In some embodiments, this step may be bypassed since the three-dimensional surface can be roughened during the substrate molding by providing roughened mold tooling where injection molding or cast molding can be used to form the substrates, or if the material of the substrate has acceptable adhesion characteristics.

In some embodiments, the coating can optionally be coated on the three-dimensional surface (step 506). There may be numerous advantages for coating the three-dimensional surface, such as, for example, wettability, mechanical integrity, adhesion, and functionalizing the three-dimensional surface with active groups.

Next, conductive traces are defined on the three-dimensional surface (step 508). Numerous methods can be used to define the conductive traces, such as, for example, screen printing, shadow mask deposition, photolithography subtractive etch, or direct ablation for subtractive etch processing. As mentioned above, the conductive traces can be printed on the three-dimensional surface using conductive pastes formed from adhesives and metal flake mixtures. For example, silver conductor conductive traces may be defined on the three-dimensional surface using a Nscrypt™ printing unit, an EFD type tip and a silver based paste, such as Du Pont 5025.

After the conductive traces are defined on the three-dimensional surface, the energization elements can be formed on conductive traces. An anode can be deposited on a subset of the conductive traces (step 510). The anode chemical mixture can partially or completely cover the subset of the conductive traces. The anode can be deposited by masking techniques or other additive techniques, subtractive techniques, growing techniques, or plating techniques such as electroplating. In some embodiments, a zinc based formulation may be deposited to define the anode. Numerous chemical mixtures and formulations can be deposited to define the anode. However, Table 1 provides an exemplary formulation.

A cathode can be deposited on another subset of the conductive traces (step 512). The cathode chemical mixture can partially or completely cover the other subset of the conductive traces. The cathode can be deposited by masking techniques or other additive techniques, subtractive techniques, growing techniques, or plating techniques such as electroplating. Numerous chemical mixtures and formulations can be deposited to define the cathode. However, Table 2 provides an exemplary formulation.

In some embodiments, a bridge can optionally be deposited in contact with the anode and the cathode (step 514). The bridge chemical mixture can partially or completely cover one or more conductive traces. The bridge can be deposited by masking techniques or other additive techniques, subtractive techniques, growing techniques, or plating techniques such as electroplating. Numerous chemical mixtures and formulations can be deposited to define the bridge. However, Table 3 provides an exemplary formulation.

Although FIG. 5 illustrates that the anode is deposited before the cathode, the anode and the cathode can be deposited in any order. In some embodiments, for example, the cathode can be deposited before the anode. Moreover, FIG. 5 illustrates that the bridge is deposited following deposition of the anode and the cathode. However, in some embodiments, the bridge can first be deposited between and/or partially on the conductive traces before the deposition of the anode and the cathode to provide for better adhesion and to isolate the anode from the cathode, particularly if the chemical mixture being printed is prone to spreading.

An electrolyte is then deposited on at least the anode and the cathode (step 516). As described above, the electrolyte can be in a liquid, gelatinous, or polymeric form. The anode, the cathode, and the electrolyte can then be encapsulated (step 518). The encapsulation seals the energization elements from other components, if any, on the three-dimensional surface. The encapsulation may be a single layer encapsulation or a double layer encapsulation, as described above. The outermost layer of encapsulating material can be biocompatible so that the energization element can be embedded in biocompatible devices.

Depending on the nature of the electrolyte, steps 516 and 518 can be reversed, such that encapsulation can be performed and followed by injection of a liquid electrolyte through the encapsulating material or through a defined filling feature formed into the encapsulating material. In such embodiments, after the liquid electrolyte is filled, the region in the encapsulating material that the filling occurred through may also be sealed. The liquid electrolyte can fill a majority, such as, for example, 80% or more, of the space defined by the encapsulating material.

In some embodiments, the substrate may optionally be removed to separate the energization element (step 520). If the energization element is to be embedded in a biocompatible device that is not part of the substrate, the biocompatible energization element can be separated and embedded in the biocompatible device. In some embodiments, exposed regions of the conductive traces that are not encapsulated can be used as interconnections to the biocompatible energization element. For example, an integrated circuit to control the various functions of the biocompatible device can be connected to the exposed conductive traces only when a triggering event occurs so that there is minimal draw on the energization element until its energy is needed.

The biocompatible devices can be, for example, implantable electronic devices, such as pacemakers and micro-energy harvesters, electronic pills for monitoring and/or testing a biological function, surgical devices with active components, ophthalmic devices, microsized pumps, defibrillators, stents, neural interfaces, medicament dispersal devices, or the like.

In some embodiments, three-dimensional biocompatible energization element can be rechargeable. For example, an inductive coil can also be fabricated on the three-dimensional surface. The inductive coil could then be energized with a radio-frequency ("RF") fob. The inductive coil can be connected to the three-dimensional biocompatible energization element to recharge the energization element when RF is applied to the inductive coil. In another example, photodiodes can also be fabricated on the three-dimensional surface and connected to the three-dimensional biocompatible energization element. When exposed to light or photons, the photodiodes will produce electrons to recharge the energization element.

Specific examples have been described to illustrate embodiments for the formation, methods of formation, and apparatus of formation of biocompatible energization elements. These examples are for said illustration and are not intended to limit the scope of the claims in any manner. Accordingly, the description is intended to embrace all embodiments that may be apparent to those skilled in the art.

The invention claimed is:

1. A method of forming a three-dimensional biocompatible energization element, the method comprising:
receiving a substrate made from an insulating material, the substrate having a smooth three-dimensional curved surface;
forming two or more conductive traces on the three-dimensional curved surface;
depositing an anode chemical formulation on at least part of a first conductive trace to form an anode;
depositing a cathode chemical formulation on at least part of a second conductive trace to form a cathode;
depositing an electrolyte over at least part of the anode and the cathode; and
encapsulating the anode, the cathode and the electrolyte with a biocompatible material to form a three-dimensional biocompatible energization element having a shape corresponding to the three-dimensional curved surface of the substrate.

2. The method of claim 1, further comprising roughening at least a portion of the three-dimensional curved surface.

3. The method of claim 1, further comprising depositing a coating on at least a portion of the three-dimensional curved surface.

4. The method of claim 1, further comprising depositing a bridge chemical formulation in contact with the anode and the cathode to form a bridge.

5. The method of claim 1, further comprising removing the substrate to separate the three-dimensional biocompatible energization element.

6. The method of claim 1, wherein the biocompatible material includes alginates, parylenes, polyacrylonitriles, polyethylene glycols, polypyrroles, derivatised celluloses, polysulfones, or polyamides.

7. The method of claim 1, wherein forming the two or more conductive traces on the three-dimensional curved surface comprises depositing a conductive chemical formulation on the three dimensional curved surface.

8. The method of claim 1, wherein the electrolyte is a gel.

9. The method of claim 1, further comprising encapsulating the anode, the cathode, and the electrolyte with a first encapsulating material different from said biocompatible material prior to, encapsulating the first material encapsulated anode, cathode, and electrolyte with said biocompatible material to form the three-dimensional biocompatible energization element.

10. The method of claim 1, wherein the anode chemical formulation includes zinc.

11. The method of claim 1, wherein the conductive traces include metal particles.

12. The method of claim 1, wherein the anode chemical formulation includes a first metal and the cathode chemical formulation includes a second metal, the second metal being different from the first metal.

13. The method of claim 4, wherein the electrolyte is deposited over the anode, the cathode and the bridge.

14. The method of claim 4, wherein the bridge completely covers the anode and the cathode.

15. The method of claim 9, wherein the first encapsulating material includes epoxies, fluoropolymers, acrylics, silicones, polyurethanes, enamels, potting compounds, or conformal coatings.

16. A three-dimensional biocompatible energization element, comprising:
 a substrate made from an insulating material, the substrate having a smooth three-dimensional curved surface;
 two or more conductive traces on the three-dimensional curved surface;
 an anode made of an anode chemical formulation disposed on at least part of a first conductive trace;
 a cathode made of a cathode chemical formulation disposed on at least part of a second conductive trace;
 an electrolyte covering at least part of the anode and the cathode; and
 a biocompatible encapsulant covering the anode, the cathode and the electrolyte,
 wherein the three-dimensional biocompatible energization element has a shape corresponding to the three-dimensional curved surface of the substrate.

17. The three-dimensional biocompatible energization element of claim 16, further comprising a coating on a portion of the three-dimensional curved surface.

18. The three-dimensional biocompatible energization element of claim 16, further comprising a bridge made of a bridge chemical formulation in contact with the anode and the cathode.

19. The three-dimensional biocompatible energization element of claim 16, wherein the biocompatible encapsulant includes alginates, parylenes, polyacrylonitriles, polyethylene glycols, polypyrroles, derivatised celluloses, polysulfones, or polyamides.

20. The three-dimensional biocompatible energization element of claim 16, wherein the anode chemical formulation includes zinc.

21. The three-dimensional biocompatible energization element of claim 16, wherein the anode chemical formulation includes a first metal and the cathode chemical formulation includes a second metal, the second metal being different from the first metal.

22. The three-dimensional biocompatible energization element of claim 18, wherein the electrolyte is deposited over the anode, the cathode and the bridge.

23. The three-dimensional biocompatible energization element of claim 18, wherein the bridge completely covers the anode and the cathode.

\* \* \* \* \*